(12) United States Patent
Satish et al.

(10) Patent No.: US 8,112,803 B1
(45) Date of Patent: Feb. 7, 2012

(54) IPV6 MALICIOUS CODE BLOCKING SYSTEM AND METHOD

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1192 days.

(21) Appl. No.: 11/615,558

(22) Filed: Dec. 22, 2006

(51) Int. Cl.
*G06F 12/16* (2006.01)
*H04L 29/06* (2006.01)

(52) U.S. Cl. ............... 726/23; 726/2; 726/3; 726/13; 726/14; 726/24; 726/26; 726/30; 726/34; 713/151; 713/152; 713/153; 713/154; 713/160

(58) Field of Classification Search ............... 726/22–23; 713/152–153
See application file for complete search history.

(56) References Cited

U.S. PATENT DOCUMENTS

| 7,379,423 | B1* | 5/2008 | Caves et al. | 370/232 |
|---|---|---|---|---|
| 2002/0112076 | A1* | 8/2002 | Rueda et al. | 709/245 |
| 2004/0095930 | A1* | 5/2004 | Bennett | 370/389 |
| 2004/0103212 | A1* | 5/2004 | Takeuchi et al. | 709/245 |
| 2004/0166857 | A1* | 8/2004 | Shim et al. | 455/436 |
| 2004/0177133 | A1* | 9/2004 | Harrison et al. | 709/220 |
| 2004/0213172 | A1* | 10/2004 | Myers et al. | 370/313 |
| 2005/0018677 | A1* | 1/2005 | Lee et al. | 370/389 |
| 2005/0025157 | A1* | 2/2005 | Pennec et al. | 370/395.5 |
| 2005/0128989 | A1* | 6/2005 | Bhagwat et al. | 370/338 |
| 2005/0174998 | A1* | 8/2005 | Vesterinen et al. | 370/354 |
| 2005/0182854 | A1* | 8/2005 | Pinkerton et al. | 709/238 |
| 2005/0232146 | A1* | 10/2005 | Lee et al. | 370/225 |
| 2006/0036733 | A1* | 2/2006 | Fujimoto et al. | 709/225 |
| 2006/0114863 | A1* | 6/2006 | Sanzgiri et al. | 370/338 |
| 2006/0215658 | A1* | 9/2006 | Uchida | 370/389 |
| 2006/0256770 | A1* | 11/2006 | Caci | 370/352 |
| 2006/0256814 | A1* | 11/2006 | Caci | 370/466 |
| 2006/0274693 | A1* | 12/2006 | Nikander et al. | 370/331 |
| 2007/0067841 | A1* | 3/2007 | Yegneswaran et al. | 726/23 |
| 2007/0130427 | A1* | 6/2007 | Lahti et al. | 711/133 |
| 2008/0165682 | A1* | 7/2008 | Ishiyama et al. | 370/230 |

OTHER PUBLICATIONS

RFC 3513, R. Hinden et al., Apr. 2003, pp. 1-19.*
RFC 2461, T. Narten et al, Dec. 1998, pp. 1-72.*
RFC 3756, P. Nikander et al, May 2004, pp. 1-19.*
Transition to IPv6: Security Implications, John R. Synder, Aug. 2005, pp. 1-10.*
"White Paper: IPV6", pp. 1-29 [online]. Retrieved on Aug. 28, 2006 from the Internet: <URL:http://www.cs-ipv6.lancs.ac.uk/ipv6/documents/papers/BayNetworks/>. No author provided.

(Continued)

*Primary Examiner* — Christian LaForgia
*Assistant Examiner* — Jenise Jackson
(74) *Attorney, Agent, or Firm* — McKay and Hodgson, LLP; Philip McKay (57) ABSTRACT

An agent on a network is preconfigured to automatically respond to neighborhood discovery by sending an advertisement having a spoof IPv6 address. A spoof IPv6 address includes a spoof NIC value that is a value that identifies a network interface card not being used on the network. Thus, upon receipt of the advertisement by the infected host computer system, malicious code on the infected host computer system probes the spoof IPv6 address space defined by a network section value of the spoof IPv6 address, the spoof NIC value, and the range of possible values of the assigned host ID value of the spoof IPv6 address. As there are no interfaces within the spoof IPv6 address space except that associated with the agent, propagation of the malicious code is slowed or defeated and connections are directed to the agent.

18 Claims, 4 Drawing Sheets

OTHER PUBLICATIONS

Narten et al., "RFC 2461—Neighbor Discovery for IP Version 6 (IPv6)", pp. 1-72 [online]. Retrieved on Aug. 28, 2006 from the Internet: <URL:http://www.faqs.org/rfcs/rfc2461.html>.

Hinden et al., "RFC 3513—Internet Protocol Version 6 (IPv6) Addressing Architecture", pp. 1-19 [online]. Retrieved on Nov. 27, 2006 from the Internet: <URL:http://www.faqs.org/rfcs/rfc3513.html>.

Bellovin et al., "Worm Propagation Strategies in an IPv6 Internet", In USENIX ;login, vol. 31, No. 1, pp. 70-76, Feb. 2006.

* cited by examiner

IPV6 MALICIOUS CODE BLOCKING SYSTEM AND METHOD

BACKGROUND OF THE INVENTION

1. Field of the Invention

The present invention relates to the protection of computer systems. More particularly, the present invention relates to a system and method of detecting and defeating Internet protocol version 6 (IPv6) propagation of malicious code.

2. Description of the Related Art

Internet protocol version 4 (IPv4) is the predominant internet protocol (IP) in current use. IPv4 uses a 32-bit address space.

Some forms of malicious code, e.g., worms such as codered and slammer worms, use random IP address space probing to detect vulnerable targets. As the IPv4 uses a 32-bit address space, address-space probing worms can scan the entire 32-bit IPv4 address space in a relatively short time, propagating to the vulnerable targets detected.

Internet protocol version 6 (IPv6) is the next generation internet protocol. IPv6 uses a 128-bit address space.

Random IP address space probing the entire 128-bit IPv6 address space by an address-space probing worm is substantially difficult, e.g., by a factor of $2^{96}$ over the 32-bit IPv4 address space by some estimations. Accordingly, address-space probing worms must become more intelligent in detecting vulnerable targets in the 128-bit IPv6 address space.

SUMMARY OF THE INVENTION

In accordance with one embodiment, an agent on a network is preconfigured to automatically respond to neighborhood discovery by sending an advertisement having a spoof IPv6 address. The agent thus acts as a live host on the network and hence when an infected host computer system attempts to communicate with the agent, a sample of the malicious code is collected.

A spoof IPv6 address includes a spoof NIC value that is a value that identifies a network interface card not being used on the network. Thus, upon receipt of the advertisement by the infected host computer system, malicious code on the infected host computer system probes the spoof IPv6 address space defined by a network section value of the spoof IPv6 address, the spoof NIC value, and the range of possible values of the assigned host ID value of the spoof IPv6 address. As there are no interfaces within the spoof IPv6 address space (except the interface associated with the agent), propagation of the malicious code is slowed or defeated.

Further, malicious code probing the spoof IPv6 address space is preferentially directed to the agent, which has an interface having an IPv6 address within the spoof IPv6 address space. Accordingly, not only is the malicious code slowed or defeated from propagating, malicious code is directed to and collected by the agent, sometimes called a honey network entity for malicious code.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 1:
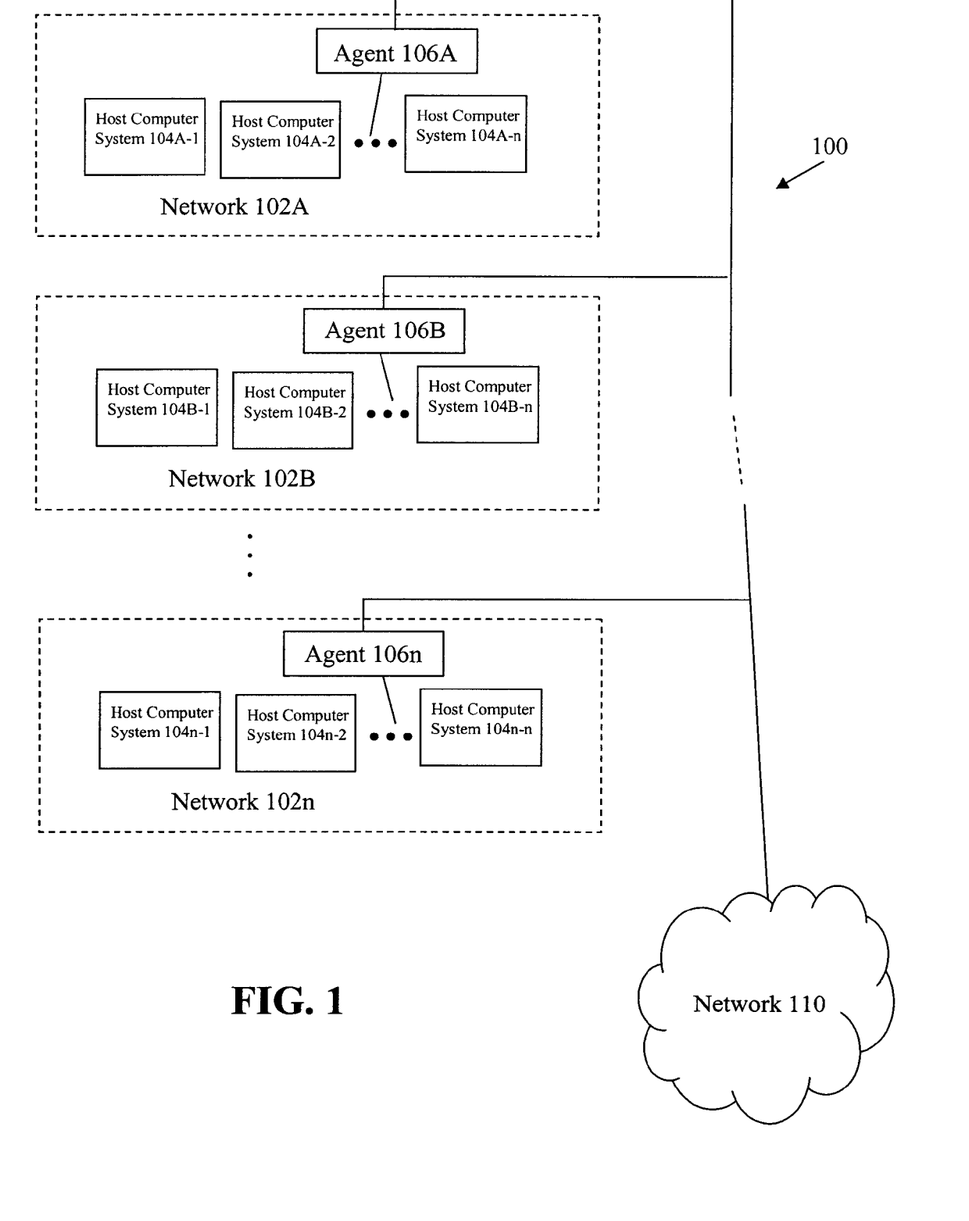
FIG. 1 is a diagram of a computer system that includes a plurality of networks in accordance with one embodiment of the present invention.
Figure 2:
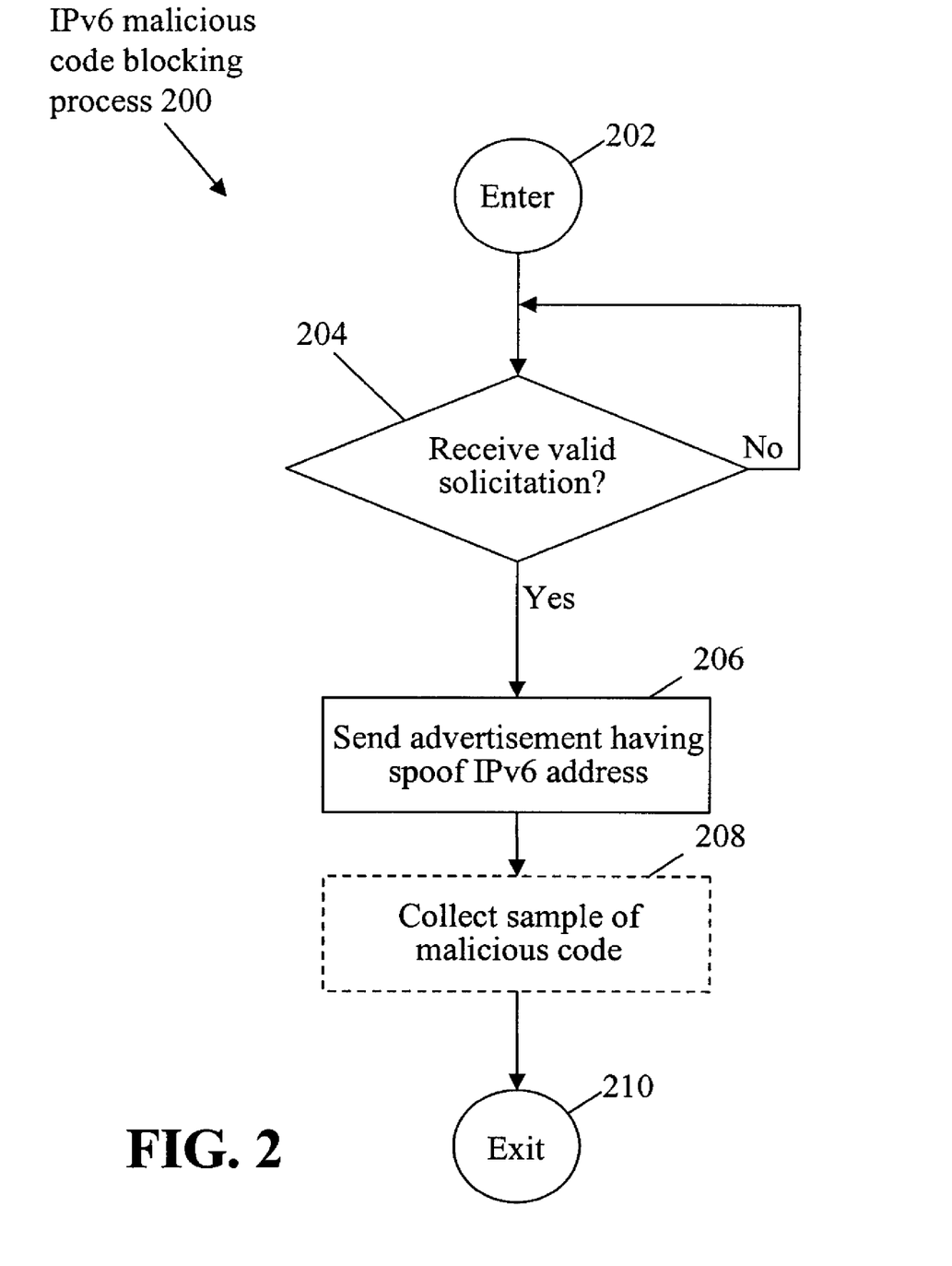
FIG. 2 is a flow diagram of an IPv6 malicious code blocking process in accordance with one embodiment of the present invention.
Figure 3:
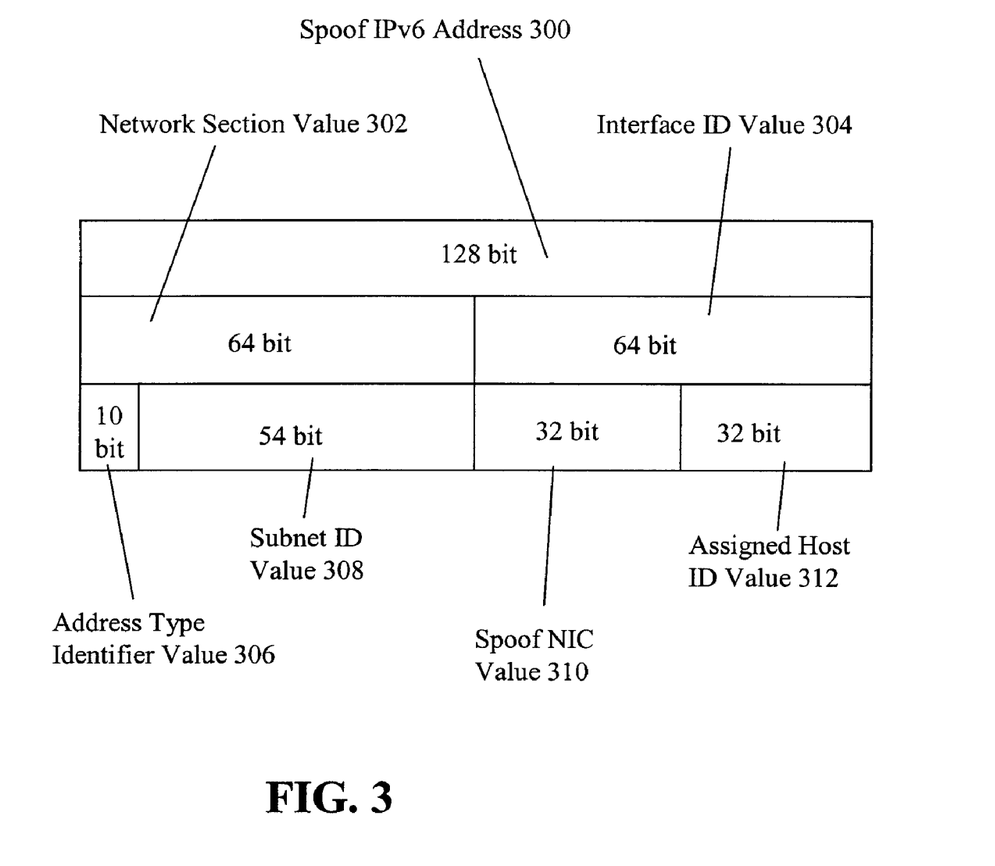
FIG. 3 is a diagram of a spoof IPv6 address in accordance with one embodiment of the present invention.

In accordance with one embodiment, referring to FIGS. 1, 2, and 3 together, an agent 106A on a network 102A is preconfigured to automatically respond to neighborhood discovery by sending an advertisement having a spoof IPv6 address (OPERATION 206). A spoof IPv6 address 300 (FIG. 3) includes a spoof NIC value 310 that is a value that identifies a network interface card not being used on network 102A. Thus, upon receipt of the advertisement by an infected host computer system 104A-1, malicious code on the infected host computer system 104A-1 probes the spoof IPv6 address space defined by a network section value 302 of spoof IPv6 address 300, spoof NIC value 310, and the range of possible values of the assigned host ID value 312 of spoof IPv6 address 300. As there are no interfaces within the spoof IPv6 address space except that associated with agent 106A, propagation of the malicious code is slowed or defeated and connections are directed to agent 106A.

More particularly, FIG. 1 is a diagram of a computer system 100 that includes a plurality of networks 102A, 102B, ..., 102n, collectively networks 102, in accordance with one embodiment of the present invention. Networks 102 use Internet protocol version 6 (IPv6) protocol including 128-bit IPv6 addresses. In one embodiment, a network 102 is a single site and/or a single link in which a local use IPv6 unicast address is used such as that described in RFC3513, "Internet Protocol Version 6 (IPv6) Addressing Architecture", section 2.5.6, April 2003. RFC3513 is herein incorporated by reference in its entirety.

These local use IPv6 unicast addresses include a link-local address in the case when a network 102 is a single link and a site-local address in the case when a network 102 is a single site. A single link is a communication facility or medium over which nodes can communicate at the link layer, i.e., the layer immediately below IP, as defined in RFC 2461, "Neighborhood Discovery For IP Version 6 (IPv6)", section 2, December 1998. RFC2461 is herein incorporated by reference in its entirety.

A node is a device that implements IP as also defined in RFC2461, section 2. As set forth in RFC3513, section 2.1, IPv6 addresses of all types are assigned to interfaces, not nodes. Thus, a node can have more than one interface and any of the node's interfaces' unicast addresses may be used as an identifier for the node.

In one embodiment, a site is a cluster of subnets and/or links of an enterprise. Illustratively, a subnet is a portion of a network that shares a common address component, for example, is defined as all interfaces that have the same prefix.

Referring to network 102A, network 102A includes a plurality of interconnected computer systems 104A-1, 104A-2, ..., 104A-n, collectively computer systems 104A, sometimes called IPv6 nodes, i.e., devices that implement IPv6. Network 102A further include an interconnected agent 106A, e.g., also an IPv6 node. As discussed further below, agent 106A is a secure appliance or gateway element that is preconfigured to automatically respond to neighborhood discovery all the time in one embodiment.

Similarly, networks 102B, ..., 102n also include a plurality of interconnected computer systems 104B-1, 104B-2, ..., 104B-n, ..., 104n-1, 104n-2, ..., 104n-n, and agents 106B, ..., 106n, respectively. Computer systems 104B-1, 104B-2, ..., 104B-n, ..., 104n-1, 104n-2, ..., 104n-n, are collectively referred to as computer systems 104B, ..., 104n, respectively.

Agents 106A, 106B, ..., 106n are collectively referred to as agents 106. In one embodiment, agents 106 detect and defeat malicious code, e.g., address-space probing worms, on networks 102.

Networks 102 are coupled to a network 110. Network 110 is any network or network system that is of interest to a user.

FIG. 2 is a flow diagram of an IPv6 malicious code blocking process 200 in accordance with one embodiment of the present invention. Execution of an IPv6 malicious code blocking application on an agent 106 and/or computer system(s) 104 results in the operations of IPv6 malicious code blocking process 200 as described below in one embodiment.

Referring now to FIGS. 1 and 2 together, from an ENTER OPERATION 202, flow moves to a RECEIVE VALID SOLICITATION CHECK OPERATION 204. In RECEIVE VALID SOLICITATION CHECK OPERATION 204, a determination is made as to whether a valid solicitation has been received, e.g., by an agent 106 from a host computer system 104. If a valid solicitation has not been received, flow remains at RECEIVE VALID SOLICITATION CHECK OPERATION 204. Conversely, if a valid solicitation has been received, flow moves to a SEND ADVERTISEMENT HAVING SPOOF IPV6 ADDRESS OPERATION 206.

As set forth in RFC 2461, neighborhood discovery is used by an IPv6 node, for example, to discover the presence of other IPv6 nodes and the link layer addresses of other IPv6 nodes. More particularly, as set forth in RFC 2461, e.g., section 4.3, during standard neighborhood discovery, a first node sends a solicitation, e.g., a neighborhood solicitation, to a second node to request the link layer address of the second node. The solicitation includes a source IPv6 address of the first node's interface and a destination IPv6 address of the second node's interface.

Upon receiving the solicitation, the second node validates the solicitation, for example, as set forth in RFC 2461, section 7.1.1. Upon determining that the solicitation is valid, the second node replies with an advertisement, e.g., as set forth in RFC 2461, section 4.4, for example. The advertisement, e.g., a neighborhood advertisement, includes a source IPv6 address of the second node's interface and a destination IPv6 address of the first node's interface.

Although neighborhood discovery is designed for legitimate use, malicious code, e.g., an address-space probing worm, of the first node can use neighborhood discovery to reduce the expansive 128-bit IPv6 address space to a much smaller more manageable address space. Specifically, an IPv6 link-local or site-local unicast address, i.e., a 128-bit value, is conceptually divided into two sections, a network section value and interface ID value. Within a single link or subnet, the network section value for all IPv6 link-local or site-local unicast addresses is the same. Further, the interface ID value includes a network interface card (NIC) value and an assigned host ID value. The NIC value identifies the network interface card of the host associated with the interface having the 128-bit IPv6 address. For example, the NIC value is assigned by the manufacturer of the network interface card.

Within a network, it is common for IPv6 hosts to use network interface cards from a small set of manufacturers. Accordingly, upon receipt of an advertisement including a source IPv6 address, malicious code can use the source IPv6 address to greatly reduce the address space to be randomly probed for vulnerable targets. Specifically, for interfaces of other hosts within a single link, all of the IPv6 addresses will have a common network section value and will likely have the same NIC value or a small set of NIC values. Accordingly, only the assigned host ID value of an IPv6 address will be different for different interfaces within the same link or subnet for hosts using the same network interface cards, i.e., cards from the same manufacturer.

Using this knowledge, upon receipt of a advertisement including a source IPv6 address, malicious code can probe the IPv6 address space defined by the network section value, the NIC value, and the range of possible values of the assigned host ID value. Accordingly, for each NIC value, the address space is equal to the range of possible values of the assigned host ID value, e.g., $2^{24}$ possible addresses by some approximations. This search space is comparable to the IPv4 address space successfully exploited by address-space probing worms.

Thus, in accordance with one embodiment, an agent 106 receives a valid solicitation using neighborhood discovery from a host computer system 104 on the same network 102 as the agent 106. For example, agent 106A receives a valid solicitation from host computer system 104A-1. In one embodiment, host computer system 104A-1 has been compromised by malicious code, e.g., an address-space probing worm, which has generated the valid solicitation. Accordingly, flow moves from RECEIVE VALID SOLICITATION CHECK OPERATION 204 to SEND ADVERTISEMENT HAVING SPOOF IPV6 ADDRESS OPERATION 206.

In SEND ADVERTISEMENT HAVING SPOOF IPV6 ADDRESS OPERATION 206, agent 106A replies to the solicitation with an advertisement having a spoof IPv6 address, i.e., sends an advertisement having a spoof IPv6 address.

FIG. 3 is a diagram of a spoof IPv6 address 300 in accordance with one embodiment of the present invention.

Referring now to FIG. 3, spoof IPv6 address 300 is a 128-bit value that is divided into a network section value 302 and an interface ID value 304. In one embodiment, when spoof IPv6 address 300 is a local-use IPv6 unicast address, e.g., as set forth in RFC 3513, section 2.5.6, network section value 302 is a 64-bit value and interface ID value 304 is a 64-bit value.

Further, network section value 302 is divided into an address type identifier value 306 and a subnet ID value 308. Illustratively, address type identifier value 306 is the following sequence of 10 bits "1111111010" in the case when spoof IPv6 address 300 is a link-local unicast address or "1111111011" in the case when spoof IPv6 address 300 is a site-local unicast address as set forth in RFC 3513, sections 2.4 and 2.5.6. Further, subnet ID value 308 is a sequence of 54 zeros, i.e., 54 zero bits, in the case when spoof IPv6 address 300 is a link-local unicast address or is the 54-bit subnet ID in the case when spoof IPv6 address 300 is a site-local unicast address as set forth in RFC 3513, section 2.5.6.

Interface ID value 304 is divided into a 32-bit spoof NIC value 310 and a 32-bit assigned host ID value 312. Assigned host ID value 312 is an assigned value, e.g., by the network administrator or auto configuration.

Spoof NIC value 310 is a 32-bit value that identifies a network interface card not being used on the network 102A, sometimes called network absent network interface card. In the case when stateless autoconfiguration is used, spoof NIC value 310 is the higher order 32 bits of the lower order 64 bits of the 128-bit spoof IPv6 address 300.

In one embodiment, agent 106A includes a spoof NIC value table of NIC values for network interface cards, and randomly or sequentially selects one of the NIC values to be used as spoof NIC value 310. In another embodiment, the network interface cards of network 102A are determined and the NIC values for the network interface cards actually used on network 102A are removed from the spoof NIC value table. Accordingly, the spoof NIC value table includes NIC values only of network interface cards not being used on network 102A.

Returning to SEND ADVERTISEMENT HAVING SPOOF IPV6 ADDRESS OPERATION 206, agent 106A replies with an advertisement including spoof IPv6 address 300.

Upon receipt of the advertisement by the infected host computer system 104A-1, malicious code on the infected host computer system 104A-1 probes the spoof IPv6 address space defined by network section value 302, spoof NIC value 310, and the range of possible values of the assigned host ID value. Spoof IPv6 address 300 is within the spoof Ipv6 address space. As there are no interfaces within the spoof IPv6 address space (except the interface associated with spoof IPv6 address 300 and agent 106A), propagation of the malicious code is slowed or defeated.

From SEND ADVERTISEMENT HAVING SPOOF IPV6 ADDRESS OPERATION 206, flow moves to an optional COLLECT SAMPLE OF MALICIOUS CODE OPERATION 208 (or exits at an EXIT OPERATION 210 in the event COLLECT SAMPLE OF MALICIOUS CODE OPERATION 208 is not performed). In COLLECT SAMPLE OF MALICIOUS CODE OPERATION 208, a sample of the malicious code is collected.

Illustratively, upon receipt of the advertisement by the infected host computer system 104A-1, malicious code on the infected host computer system 104A-1 propagates to agent 106A. In one embodiment, agent 106A is configured to have or emulate an exploitable vulnerability that is exploited by the malicious code to propagate to agent 106A. Once within agent 106A, the malicious code is collected, e.g., for analysis. The malicious code can be collected using any one of a number of techniques, e.g., by emulating a buffer overflow vulnerability, and the particular technique used to collect the sample of the malicious code is not essential to this embodiment of the present invention.

In another embodiment, in COLLECT SAMPLE OF MALICIOUS CODE OPERATION 208, infected host computer system 104A-1 is quarantined to prevent the spread of the malicious code. The malicious code is then collected from infected host computer system 104A-1 and/or quarantined or deleted.

From COLLECT SAMPLE OF MALICIOUS CODE OPERATION 208, flow moves to and exits at EXIT OPERATION 210 or returns to RECEIVE VALID SOLICITATION CHECK OPERATION 204, and awaits the next valid solicitation.

In another embodiment, SEND ADVERTISEMENT HAVING SPOOF IPV6 ADDRESS OPERATION 206 is performed without first receiving a solicitation, i.e., IPv6 malicious code blocking process 200 is performed without RECEIVE VALID SOLICITATION CHECK OPERATION 204. In accordance with this embodiment, upon receipt of the advertisement, malicious code on an infected host computer system, e.g., host computer system 104A-1, probes the spoof IPv6 address space and/or propagates to the agent, e.g., agent 106A. In this manner, malicious code probing the spoof IPv6 address space is preferentially directed to the agent, which has an interface having an IPv6 address within the spoof IPv6 address space. Accordingly, not only is the malicious code slowed or defeated from propagating, malicious code is directed to the agent, sometimes called a honey network entity for malicious code.

Figure 4:
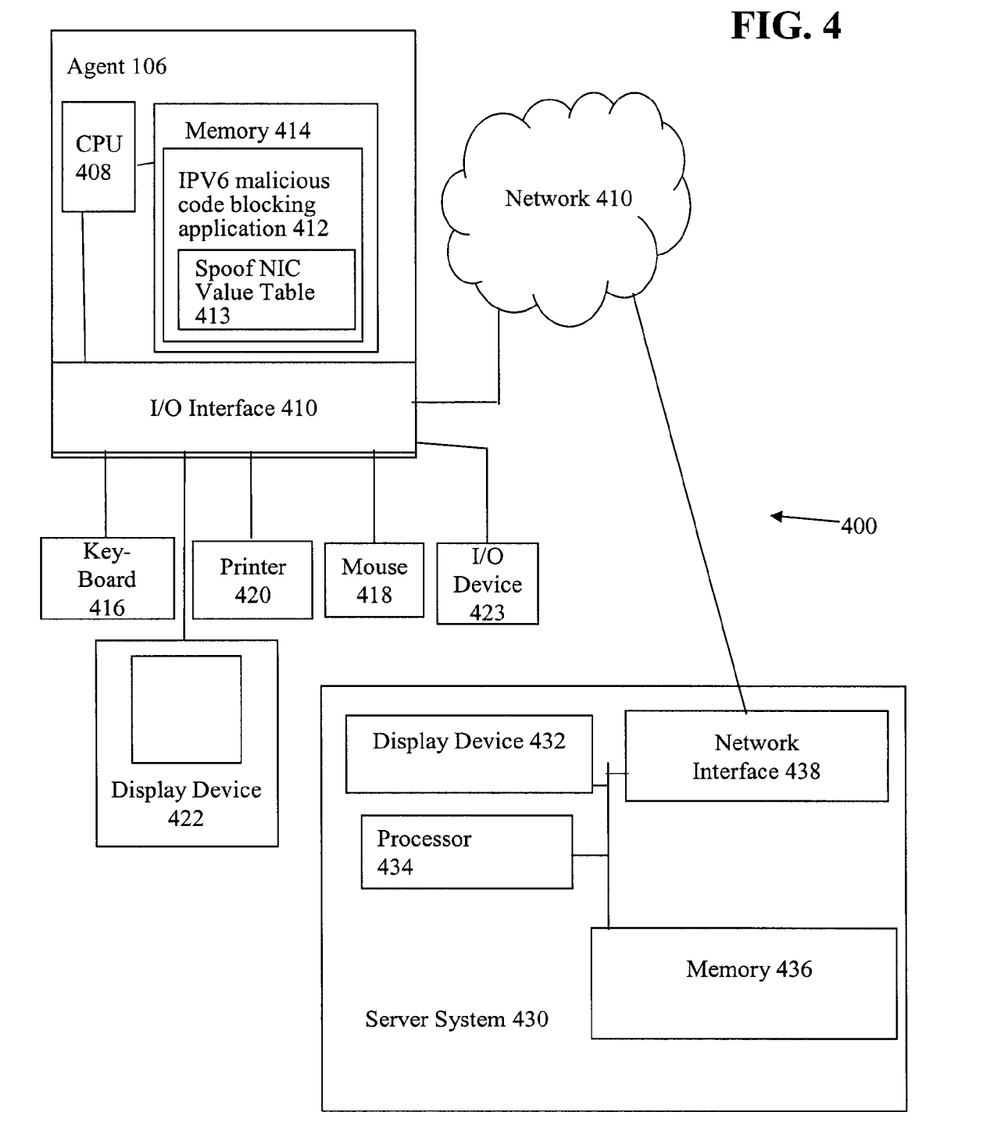
FIG. 4 is a diagram of a client-server system that includes an IPv6 malicious code blocking application executing on an agent in accordance with one embodiment of the present invention.

FIG. 4 is a diagram of a client-server system 400 that includes an IPv6 malicious code blocking application 412 executing on an agent 106, e.g., a first computer system, in accordance with one embodiment of the present invention. IPv6 malicious code blocking application 412 includes a spoof NIC value table 413 comprising spoof NIC values in one embodiment.

Referring now to FIGS. 1 and 4 together, agent 106 of FIG. 4 is representative of a computer system 104 and/or an agent 106 of FIG. 1 in one embodiment. Further, client-server system 400 is part of computer system 100 (FIG. 1) in one embodiment.

Agent 106, sometimes called a client or user device, typically includes a central processing unit (CPU) 408, hereinafter processor 408, an input output (I/O) interface 410, e.g., a network interface card, and a memory 414. Agent 106 may further include standard devices like a keyboard 416, a mouse 418, a printer 420, and a display device 422, as well as, one or more standard input/output (I/O) devices 423, such as a compact disk (CD) or DVD drive, floppy disk drive, or other digital or waveform port for inputting data to and outputting data from agent 106. In one embodiment, IPv6 malicious code blocking application 412 is loaded into agent 106 via I/O device 423, such as from a CD, DVD or floppy disk containing IPv6 malicious code blocking application 412.

Agent 106 is coupled to a server system 430 of client-server system 400 by a network 410. Server system 430 typically includes a display device 432, a processor 434, a memory 436, and a network interface 438, e.g., a network interface card.

Network 410 can be any network or network system that is of interest to a user. In various embodiments, network interface 438 and I/O interface 410 include analog modems, digital modems, or a network interface card.

IPv6 malicious code blocking application 412 is stored in memory 414 of agent 106 and executed on agent 106. The particular type of and configuration of agent 106 and server system 430 are not essential to this embodiment of the present invention.

IPv6 malicious code blocking application 412 is in computer memory 414. As used herein, a computer memory refers to a volatile memory, a non-volatile memory, or a combination of the two.

Although IPv6 malicious code blocking application 412 is referred to an application, this is illustrative only. IPv6 malicious code blocking application 412 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, execution of IPv6 malicious code blocking application 412 by processor 408 results in the operations of IPv6 malicious code blocking process 200.

While embodiments in accordance with the present invention have been described for a client-server configuration, an embodiment of the present invention may be carried out using any suitable hardware configuration and/or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible medium configured to store computer readable code including CD-ROM discs, DVDs, ROM cards, floppy discs, magnetic tapes, computer hard drives and servers on a network.

As illustrated in FIG. 4, this medium may belong to the computer system itself. However, the medium also may be removed from the computer system. For example, IPv6 malicious code blocking application 412 may be stored in memory 436 that is physically located in a location different from processor 408. Processor 408 should be coupled to the memory 436. This could be accomplished in a client-server system, or alternatively via a connection to another computer via modems and analog lines, digital interfaces and a digital carrier line, or wireless or cellular connections.

More specifically, in one embodiment, agent 106 and/or server system 430 is a portable computer, a workstation, a two-way pager, a cellular telephone, a smart phone, a digital wireless telephone, a personal digital assistant, a server computer, an Internet appliance, or any other device that includes components that can execute the IPv6 malicious code blocking functionality in accordance with at least one of the embodiments as described herein. Similarly, in another embodiment, agent 106 and/or server system 430 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the IPv6 malicious code blocking functionality in accordance with one embodiment of the present invention can be implemented in a wide variety of computer system configurations. In addition, the IPv6 malicious code blocking functionality could be stored as different modules in memories of different devices. For example, IPv6 malicious code blocking application 412 could initially be stored in server system 430, and then as necessary, a portion of IPv6 malicious code blocking application 412 could be transferred to agent 106 and executed on agent 106. Consequently, part of the IPv6 malicious code blocking functionality would be executed on processor 434 of server system 430, and another part would be executed on processor 408 of agent 106. In view of this disclosure, those of skill in the art can implement various embodiments of the present invention in a wide-variety of physical hardware configurations using an operating system and computer programming language of interest to the user.

In yet another embodiment, IPv6 malicious code blocking application 412 is stored in memory 436 of server system 430. IPv6 malicious code blocking application 412 is transferred over network 410 to memory 414 in agent 106. In this embodiment, network interface 438 and I/O interface 410 would include analog modems, digital modems, or a network interface card. If modems are used, network 410 includes a communications network, and IPv6 malicious code blocking application 412 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A system comprising:
a network having a first node;
a computing system coupled to the network as a second node, and having a processor and a memory, the memory having instructions stored therein which when executed by the processor, perform a process comprising:
sending an advertisement having a spoof Internet protocol version 6 (IPv6) address, the spoof IPV6 address having a spoof NIC value that identifies a network interface card not being used by any other nodes on the network, a spoof NIC value being a value in the upper 32 bits of the lower 64 bits of the address used on the network by the computing system.

2. The system of claim 1, the process further comprising determining whether a valid solicitation has been received.

3. The system of claim 2 wherein upon a determination that a valid solicitation has been received, said process comprising said sending.

4. The system of claim 1 wherein said sending is performed upon receiving a solicitation.

5. The system of claim 4 wherein said solicitation is sent from a first node.

6. The system of claim 5 wherein said first node comprises malicious code.

7. The system of claim 6 wherein said malicious code comprises an address-space probing worm.

8. The system of claim 6, the process further comprising collecting a sample of said malicious code.

9. The system of claim 5 wherein said solicitation is a request for an address of the second node.

10. The system of claim 9 wherein said sending an advertisement having a spoof Internet protocol version 6 (IPv6) address comprises sending said advertisement from said second node.

11. The system of claim 4 wherein said solicitation and said advertisement are part of neighborhood discovery.

12. The system of claim 4, the process further comprising validating said solicitation.

13. The system of claim 1, wherein said spoof IPv6 address is a 128-bit value that is divided into a network section value and an interface ID value.

14. The system of claim 13 wherein network section value is divided into an address type identifier value and a subnet ID value.

15. The system of claim 13 wherein said interface ID value is divided into a spoof network interface card (NIC) value and an assigned host ID value.

16. The system of claim 15 wherein a spoof IPv6 address space is defined by said network section value, said spoof NIC value, and a range of possible values of said assigned host ID value.

17. A computer-program product comprising a tangible nontransitory computer readable medium containing computer program code comprising:
a IPv6 malicious code blocking application for execution by a processor coupled to a network as a first node, the processor sending an advertisement having a spoof Internet protocol version 6 (IPv6) address, the spoof IPV6 address having a spoof NIC value that identifies a network interface card not being used by any other nodes on the network, a spoof NIC value being a value in the upper 32 bits of the lower 64 bits of the address used on the network by the processor.

18. A computer system comprising:

a memory having stored therein a IPv6 malicious code blocking application; and a processor coupled to said memory and coupled to a network as a first node, wherein execution of said IPv6 malicious code blocking application generates a method comprising:

sending an advertisement on the network, the advertisement having a spoof Internet protocol version 6 (IPv6) address, the spoof IPV6 address having a spoof NIC value that identifies a network interface card not being used by any other nodes on the network, a spoof NIC value being a value in the upper 32 bits of the lower 64 bits of the address used on the network by the processor.

* * * * *